3,490,913
BIOLOGICAL STABILIZATION OF ALCOHOL BEVERAGES
Marcel Loncin, Sint Pieters Leeuw, Belgium, assignor, by mesne assignments, to Jos. Schlitz Brewing Company, Milwaukee, Wis., a corporation of Wisconsin
No Drawing. Filed June 12, 1967, Ser. No. 645,596
Claims priority, application Great Britain, June 21, 1966, 27,661/66; Sept. 9, 1966, 40,292/66
Int. Cl. C12h *1/00*
U.S. Cl. 99—48           4 Claims

ABSTRACT OF THE DISCLOSURE

Beer, wine and cider are biologically stabilized by adding to the beverage an ester of gallic acid of an alcohol containing 8 to 10 carbon atoms.

---

The invention relates to a method for the biological stabilization of beer, wire and cider, these beverages being designated hereunder as alcoholic beverages.

In accordance with the invention the stabilization is obtained by the addition of 2 to 20 parts per million (p.p.m.), preferably 5 to 15 p.p.m., of at least one ester of gallic acid, the alcohol of which contains 8 to 10 carbon atoms, to alcoholic beverages.

Alcoholic beverages must previously be filtered carefully and possibly pasteurized in bulk, in order to reach a sufficiently low content in living microbial cells, preferably less than 100 cells/ml.

Generally the active concentration of ester of gallic acid is between 5 and 15 p.p.m., e.g. 10 p.p.m. This concentration depends on the length of the alkyl chain and is lower as the alkyl chain is longer and the alcoholic beverage is less infected.

With the highest concentrations, turbidity may occur, due to the low solubility of these esters or to the presence of reaction products between these esters and the proteins contained in the alcoholic beverage.

It is possible to avoid proteic turbidity by stabilizing the beverage, e.g. by adding proteolytic enzymes. This treatment is well known and currently in use, especially in breweries.

It was certainly impossible to anticipate the fact that these esters, which are only slightly soluble in water and have at the most a weak fungicidal action, would be so efficient at such weak concentrations in their inhibition of microbial developments in beer, wine and cider.

In fact:

(1) So far the use of these esters for the biological stabilization of alcoholic beverages has not been described in the literature.

(2) The weak anti-mould action of these esters is known (French Patent No. 474,700). It was however not possible to deduce from this fact that these esters would be active against yeast, lactobacilla, acetic acid producing bacteria and sarcina, because these micro-organisms are completely different from moulds in biological, morphological and biochemical terms.

(3) If the inhibitory effect of gallic acid esters on mould development especially in products containing fatty material and at concentrations higher than 50 p.p.m., is established, these concentrations are much higher than those to be used in accordance with the present invention.

The use of parahydroxybenzoates of long chain alcohols as stabilizing agents for beer is suggested in U.S. Patent 3,175,912 and in the "American Brewer" issue of February 1966 pp. 22 and 23. These publications also point out the interest of this biological stabilization.

Esters of gallic acid have certain advantages compared with parahydroxybenzoates, in particular better solubility in alcoholic beverages and water. So, for example, the solubility of octyl gallate in water and beer is nearly seven times as great as that of octyl parahydroxybenzoate. Moreover, parahydroxybenzoates of long chain alcohols must be used as alkaline solutions which are not very stable and may influence the pH of the beverage.

The esters of gallic acid, the alcohols of which contain 8–10 carbon atoms, can be added as such or in solution in a suitable solvent, such as ethanol or propylene glycol. This solution can be injected continuously by means of a metering pump.

The dissolution of gallic acid esters in alcoholic beverages when they are in a crystallized state is generally slow and incomplete. Better solubility can be obtained by passing the beverage through a porous inert material which has been previously mixed with a gallic acid ester or impregnated with a solution of this ester in a solvent such as methanol, isopropanol, acetone or propylene glycol, the solvent being eliminated afterwards by heating or water rinsing. As porous inert material, one can use for instance distomaceous earth (kieselguhr), asbestos or cellulose. The length of the gallic acid ester chain, the concentration of the ester in the porous material and the rate of flow of the alcoholic beverage through a layer of this material having a given thickness can be selected so as to dissolve an efficient bacteriostatic concentration, i.e. generally one between 5 and 15 p.p.m.

The following examples are given for illustrating the application of the invention.

EXAMPLE 1

10 p.p.m. of pure octyl gallate were added to bottled beer. This beer was previously filtered on asbestos plates in accordance with the traditional method of brewers. There was a concentration corresponding to 3.3 mg. pure octyl gallate in each bottle having a content of 330 cm.$^3$. Octyl gallate was added as ethanol solution. The bottles were then closed, shaken and stored at a temperature of 25° C. After 25 to 35 days, the control bottles (without any octyl gallate) showed a growth of several microorganisms, i.e. yeast, lacto-bacilla and sarcina, which gave rise to turbidity and deposits. After 200 days the bottles with octyl gallate did not show any signs of deterioration.

With nonyl gallate, the results were about the same.

When the length of the alkyl chain is further increased the preservative action was maintained, but the very poor solubility of these products made their utilization much more difficult.

EXAMPLE 2

Italian white wine from Trebbiano grapes.
Alcohol content 11%.
Total acidity in terms of tartaric acid: 6.2 g./litre.
Volatile acidity in terms of acetic acid: 0.57 g./litre.

First 1% glucose and then a mixture of microorganisms of spoiled wines were added to the abovementioned wine. Finally, 5, 10, 15 and 20 p.p.m. of octyl gallate were added as alcoholic solution. The wine was preserved in half-filled bottles at room temperature for 28 days. The following results were achieved:

Wine without octyl gallate

Very strong development of micro-organisms. Appearance of cloudiness, turbidity and deposit. Volatile acidity: 1.98 gr./litre in terms of acetic acid.

Wine with 5, 10, and 15 p.p.m. of octyl gallate

No visible deterioration. Volatile acidity: 0.60–0.62 gr./litre in terms of acetic acid.

Wine with 20 p.p.m. of octyl gallate

Occurrence of slight non-microbial turbidity. Volatile acidity: 0.58 gr./litre in terms of acetic acid.

EXAMPLE 3

100 parts of diatomaceous earth (kieselguhr) were mixed with 20 parts in weight of a solution of 10% octyl gallate in methanol. The solvent was later eliminated by mixing and gentle heating.

From this product 500 g. per m.² were spread as top layer of a suitable support, consisting in a finely meshed metal gauze.

Beer at 2° C. was then run through the filtering layer at a rate of 250–300 litres per hour per m.². It came out with a content of about 10 p.p.m. of octyl gallate. This beer could be kept in bottles or barrels for 3 months without showing any yeast or mould development.

During filtration, diatomaceous earth was added as a slurry at the rate of 50–100 g. of earth for every 100 litres of beer. The earth was impregnated with octyl gallate as described above. Even when filtration was interrupted for several hours, the octyl gallate content never exceeded 20 p.p.m.

I claim:
1. A method for the biological stabilization of an alcoholic beverage selected from the group consisting of beer, wine and cider, by inhibiting the development of the microorganisms selected from the group consisting of lactobacilli, sarcinate, acetic acid producing bacteria and yeasts, comprising adding to a said beverage at least one ester of gallic acid and of an alcohol containing 8 to 10 carbon atoms, in a soluble amount of at least two parts per million.

2. A method as claimed in claim 1, said amount being 5 to 15 parts per million.

3. A method as claimed in claim 1, said ester being octyl gallate and said amount being about 10 parts per million.

4. A method as claimed in claim 1, in which said ester is added in solution in an organic solvent selected from the group consisting of ethanol and propylene glycol.

References Cited

UNITED STATES PATENTS

| 2,590,076 | 3/1952 | Fessler | 99—35 |
| 2,709,657 | 5/1955 | Campbell et al. | |
| 2,722,483 | 11/1955 | Winkler. | |
| 3,082,089 | 3/1963 | Miyachi | 99—48 |
| 3,232,766 | 2/1966 | Strandskov et al. | 99—48 |

FOREIGN PATENTS 974,700    2/1951    France.

OTHER REFERENCES

Dittrich et al., Fermentation Inhibitory Action of Gallic Acid Esters, Chemicals Abstracts, 1966, vol. 65, 14144(e).

Van Sluis K, J. H., The Higher Alkyl Gallates As Antioxidants, Food Manufacture, March 1951, pp. 99–101.

A. LOUIS MONACELL, Primary Examiner

D. M. NAFF, Assistant Examiner

U.S. Cl. X.R.

99—35, 150, 213, 224